United States Patent
Batalama et al.

[11] Patent Number: 6,078,573
[45] Date of Patent: *Jun. 20, 2000

[54] CIRCUITRY AND METHOD FOR DEMODULATING CODE DIVISION MULTIPLE ACCESS (CDMA) SIGNALS

[75] Inventors: Stella N. Batalama; Dimitris A. Pados, both of Williamsville, N.Y.

[73] Assignee: Research Foundation of State University of New York, Amherst, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/827,941

[22] Filed: Apr. 12, 1997

Related U.S. Application Data

[60] Provisional application No. 60/043,648, Apr. 11, 1997.

[51] Int. Cl.[7] .............................. H04B 7/216; H04B 1/10
[52] U.S. Cl. ............................................. 370/335; 375/350
[58] Field of Search ................................... 370/201, 290, 370/291, 293, 335, 342, 320; 375/350, 200

[56] References Cited

U.S. PATENT DOCUMENTS

| | | | |
|---|---|---|---|
| 5,138,631 | 8/1992 | Taylor | 375/200 |
| 5,267,266 | 11/1993 | Chen | 375/350 |
| 5,291,525 | 3/1994 | Funderburk et al. | 375/345 |
| 5,343,496 | 8/1994 | Honig et al. | 370/342 |
| 5,345,472 | 9/1994 | Lee | 370/342 |
| 5,353,300 | 10/1994 | Lee et al. | 375/1 |
| 5,377,225 | 12/1994 | Davis | 370/342 |
| 5,414,699 | 5/1995 | Lee | 370/342 |
| 5,420,850 | 5/1995 | Umdea et al. | 370/335 |
| 5,448,590 | 9/1995 | Kostic | 375/200 |
| 5,479,363 | 12/1995 | Willson, Jr. et al. | 364/724.16 |
| 5,481,533 | 1/1996 | Honig et al. | 370/533 |
| 5,644,596 | 7/1997 | Sih | 375/350 |
| 5,648,983 | 7/1997 | Kostic et al. | 375/200 |

OTHER PUBLICATIONS

M. Honig et al. "Blind Adaptive Multiuser Detection", IEEE Transactions on Information Theory, vol. 41, No. 4, pp. 944–960, Jul. 1995.

U. Madhow et al., "MMSE Interference Suppression For Direct–Sequence Spread–Spectrum CDMA", IEEE Transactions on Communications, vol. 42, No. 12, pp. 3178–3188, Dec. 1994.

R. Lupas et al., Linear Multiuser Detectors for Synchronous Code–Division Multiple–Access Channels, IEEE Transactions on Information Theory, vol. 35, No. 1, pp. 123–136, Jan. 1989.

D.S. Chen et al. "An Adaptive Multiuser Receiver For CDMA Systems", IEEE Journal on Selected Areas in Communications, vol. 12, No. 5, pp. 808–816, Jun. 1994.

Z. Xie, et al., "A Family of Suboptimum Detectors for Coherent Multiuser Communications", IEEE Journal on Selected Areas in Communication, vol. 8, No. 4, pp. 683–690, May 1990.

*Primary Examiner*—Chi H. Pham
*Assistant Examiner*—Steven Nguyen
*Attorney, Agent, or Firm*—Hodgson, Russ, Andrews, Woods & Goodyear LLP

[57] ABSTRACT

A method and apparatus is provided for demodulating direct sequence, spread spectrum CDMA signals in the presence of unknown spread-spectrum multiuser interference and additive white Gaussian noise, using only the available received signal and the predetermined, pre-stored spreading code assigned to user of interest. The method includes the steps of sampling the incoming channel signal at the chip rate to produce an incoming sampled signal, supplying the incoming sampled signal to filter having tap coefficients corresponding to an auxiliary vector, the filter having an output representing an estimate of the transmitted symbol, providing the output to a sign determining components and determining the sign of the output to thereby generate the detected symbol.

5 Claims, 9 Drawing Sheets

CIRCUITRY AND METHOD FOR DEMODULATING CODE DIVISION MULTIPLE ACCESS (CDMA) SIGNALS

CROSS REFERENCE TO RELATED APPLICATIONS

This application claims the benefit of U.S. Provisional Application Ser. No. 06/043,648 of the same title and by the same inventors, filed Apr. 11, 1997.

BACKGROUND OF THE INVENTION

1. Field of the Invention

The present invention relates to communication systems which employ spread-spectrum signals and, more particularly, to receivers for detecting spread-spectrum signals in a Direct Sequence (DS) CDM communication system.

2. Background of the Invention

The wireless telecommunications industry provides the capability of telephony to a moving public through cellular phones. CDMA is a military-based digital communication system and a digital standard for cellular phone systems. A special case of the CDMA system is a spread-spectrum system, i.e. spread spectrum CDMA or SS/CDMA. In a spread-spectrum system, a modulation technique is utilized in which a transmitted signal is spread over a wide frequency band within the communication channel.

One type of spread-spectrum communication technique, direct sequence modulation, relates particularly to the present invention. In direct sequence (DS) modulation, a carrier signal is modulated by a digital code sequence whose bit rate is much higher than the information signal bandwidth. In direct sequence systems communication between two communication units is accomplished by spreading each transmitted signal over the frequency band of the communication channel with a unique user spreading code, hereinafter referred to as a signature or code. As a result, transmitted signals are in the same frequency band of the communication channel and are separated only by the unique user spreading codes or signatures.

Information (i.e. the message signal consisting of voice and/or data) can be embedded in the direct sequence spread-spectrum signal by several methods. One method is to add the information to the spreading code before it is used for spreading modulation. Alternatively, the information or message signal may be used to modulate a carrier after spreading it.

Particular transmitted signals can be retrieved from the communication channel by despreading a signal representative of the sum of signals in the communication channel with a user spreading code related to the particular transmitted signal which is to be retrieved from the communication channel.

Preferably, the user spreading codes are orthogonal to one another such that when the received signal is correlated with a particular user spreading code, only the desired user signal related to the particular spreading code is preserved, while the other signals for all of the other users are eliminated. In many cases the spreading codes are not orthogonal. This may occur by design or may exist due to the transmission characteristics of the channel.

Several different spreading codes are known which can be used to separate data signals from one another in a DS CDMA communication system. These spreading codes include but are not limited to pseudo noise (PN) codes and Walsh codes.

In a mobile cellular phone system, there are problems inherent in designing DS/SS CDMA receivers for either the mobile user or the base station with which it communicates. The base station must simultaneously detect and recover all signals of the known mobile users in its domain. Given that the optimum multiuser detector exhibits unrealizable complexity, i.e. exponential in the number of users and system processing gain, suboptimal linear-complexity solutions were sought. Some proposals include the decorrelating receiver, multistage architectures and decision feedback detectors.

The mobile users, however, have a more difficult problem. Knowing only its own signature, a mobile user's receiver must detect its own information bits in the presence of unknown spread spectrum, or multiple access (MAI) interference, and additive white Gaussian (AWG) channel noise.

Increasing the challenge of designing the mobile receiver is the fact that it must be of a desirable size and weight, i.e. lighter and smaller than would be acceptable for a base station receiver.

Demodulating a DS/SS CDMA signal in the presence of multiple access interference has been previously addressed in the prior art. One solution, the "matched filter (MF) solution exhibits performance degradation in the presence of one or more high power interferers, known as the "near-far" problem. This characteristic of MF receivers requires that they be used with some form of stringent, and costly, power control.

U.S. Pat. No. 5,345,472 to Lee discloses a DS/SS CDMA receiver for adaptively decoding DS/SS communication signals. In this system the CDMA transmitter transmits a training bit sequence and the receivers adaptively determine, based on the training sequence, the despreading codes. This is accomplished by converging or minimizing the error between the received training bit sequence and the reference bit sequences.

While this system allows all users to communicate with each other over a channel without requiring knowledge of system parameters, it disadvantageously requires transmission of a separate training sequence which places a concomitant processing burden on the receiver.

U.S. Pat. No. 5,343,496 to Honig et al. discloses circuitry and concomitant methodology for demodulating DS/SS CDMA channel signals using multiple samples per transmitted symbol and a minimum mean-square error criterion to suppress interference. Honig et al, propose to minimize the mean-square error (MSE) between the output of the filter and the desired information bit. However, this technique has the disadvantage of requiring a separate training sequence.

SUMMARY OF THE INVENTION

These deficiencies as well as other shortcomings and limitations of the prior art are obviated, in accordance with the present invention, by circuitry and methods for demodulating CDMA signals by parametizing a linear detector with respect to a single scalar parameter.

Broadly, in accordance with a first aspect of the invention, a CDMA receiver incorporates a circuit for demodulating a received signal wherein the received signal includes a transmitted symbol, unwanted interference and noise. The circuit includes means for obtaining one or more discrete samples of the received signal and means, responsive to the means for obtaining one or more discrete samples, for filtering out the unwanted interference and noise. The filtering out means includes multiplying means having at least two sets of inputs, at least one set being determined by the relationship between the parameters $S_0$, k, and G. In one embodiment of the invention the relationship is $S_0-kG$. In a second embodiment the relationship is $G+kS_0$.

It is a further object of the present invention to provide a method for demodulating a received signal wherein the received signal includes a transmitted symbol and unwanted interference and noise, the method including the steps of: a) obtaining one or more discrete samples of the received signal; b) filtering out the unwanted interference and noise from the discrete samples wherein the filtering out step includes the step of multiplying at least two sets of inputs, at least one set being determined by the relationship between the parameters $S_0$, k, and G. The method may further include the steps of providing the output of step b to sign determining means, determining the sign of the filtered output and generating a representation of the transmitted symbol based on the sign determined in the previous step.

BRIEF DESCRIPTION OF THE DRAWINGS

For a further understanding of the invention, as well as its characterizing features, reference should now be made to the accompanying drawings wherein.

DETAILED DESCRIPTION OF THE INVENTION

The detector of the present invention provides for the detection of binary antipodal signals, such as those employed in DS/SS CDMA communications systems, in the presence of unknown spread-spectrum multiuser interference and additive white Gaussian noise (AWGN). The detector of the present invention reconstructs the transmitted symbol from the received composite signal using only the predetermined spreading code(ref erred to herein as the signature, or code) assigned to the user of interest, i.e. the user to whom the information is being transmitted.

Figure 1:
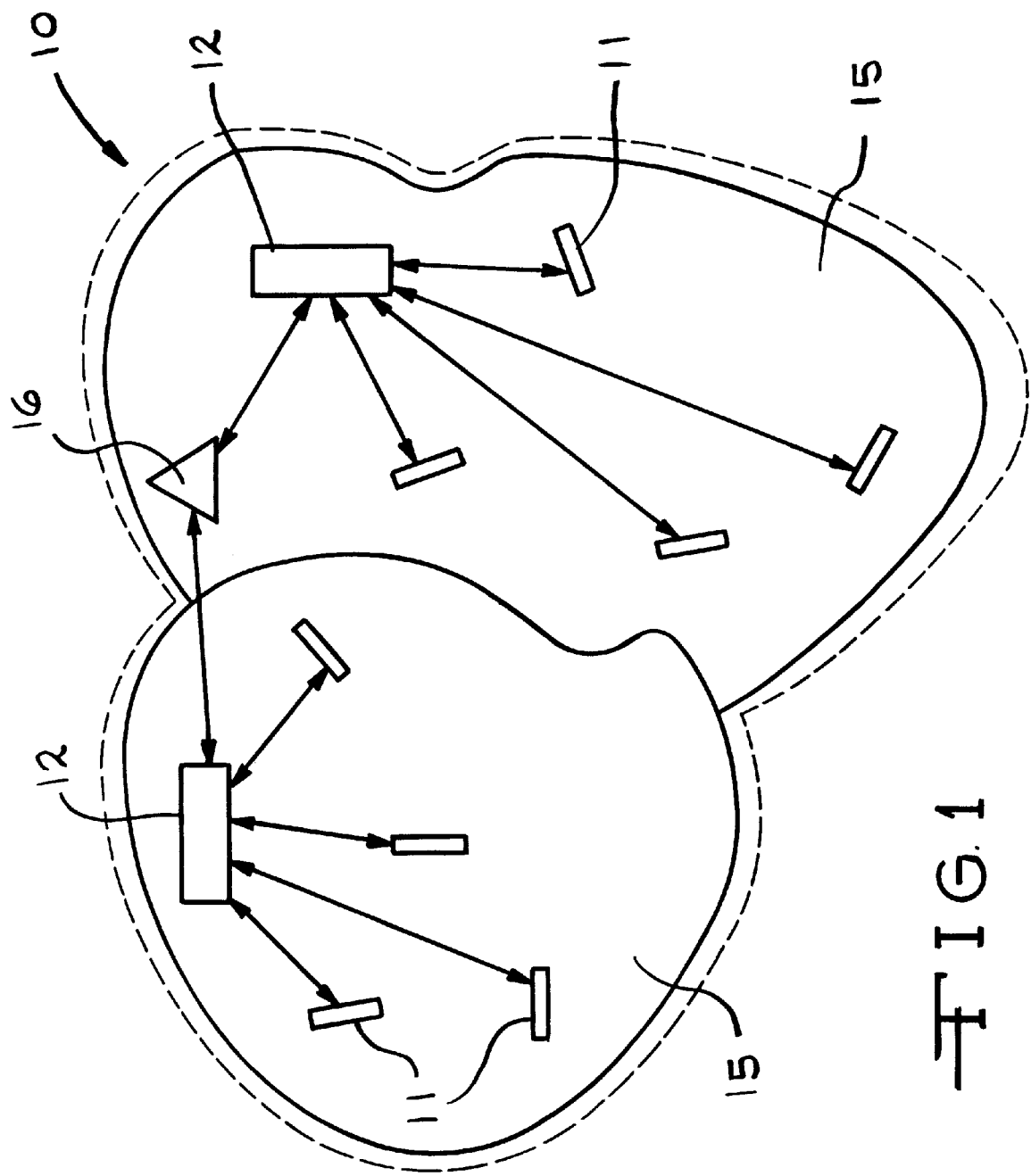
FIG. 1 is a pictorial diagram of a communication system of interest in accordance with the present invention.

FIG. 1 depicts a typical cellular telephony system 10. In system 10 a geographical area, e.g., a metropolitan area, is divided into several smaller, contiguous radio coverage areas, or cells 15. Cells 15 are served by a series of fixed radio stations, or base stations 12. Base stations 12 are connected to and controlled by a mobile services switching center (MSC) 16. MSC 16, in turn, is connected to the landline (wireline) public switched telephone network (PSTN) (not shown).

The telephone users, or mobile subscribers 11 in the cellular radio system are provided with portable (hand-held), transportable (hand-carried) or mobile (car-mounted) telephone units (mobile stations) which communicate voice and/or data with each other through a nearby base station 12. MSC 16 switches calls between and among wireline and mobile subscribers 11, controls signaling to the mobile subscribers 11, compiles billing statistics, and provides for the operation, maintenance and testing of the system 10.

Figure 2:
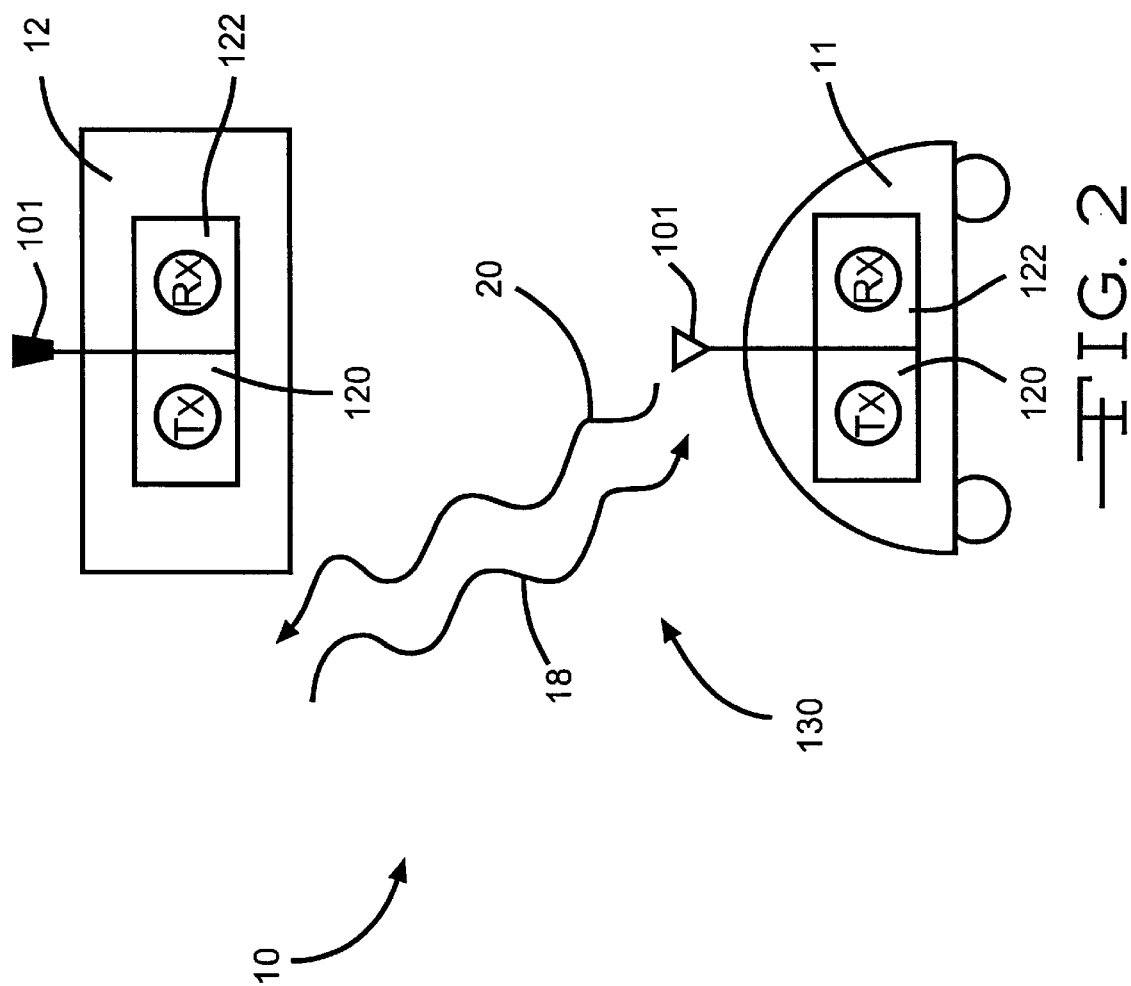
FIG. 2 is a pictorial diagram showing a base station, a representative mobile user, and a communication channel therebetween.

FIG. 2 is a pictorial representation of a representative base station 12 and a representative mobile subscriber 11 of the system shown in FIG. 1. Communication system 10 can be considered to comprise generally a plurality of sources, or transmitters 120, of which two representative examples are shown in FIG. 2, and a plurality of receivers 122 of which two representatives are also shown in FIG. 2.

In the wireless telecommunication system contemplated by the present invention, a receiver may be associated with either a base station or a mobile unit. Likewise a transmitter may be associated with either a base station or a mobile unit.

The sources, or transmitters 120 and receivers 122 are interconnected by a communications channel 130. Channel 130 propagates DS/SS CDMA signals produced by the sources 120. Each source 120 and each receiver 122 is associated with a pre selected CDMA signature sequence that corresponds to a particular subscriber and this signature is used for both transmission and reception.

Each mobile receiver 122 and transmitter 120 knows of the unique spreading chip sequence, or signature, which will be used to transmit information between them prior to the start of a communication call. Thereafter, the receiver 122 decodes the DS-SS communication signal based on the known spreading chip sequence.

Each receiver, 122, demodulates the incoming DS SS CDMA channel signal by sampling the incoming channel signal at a rate corresponding to the processing gain of the CDMA channel signal to produce a sampled incoming signal and processes the discrete samples to finally detect the information bit of the user of interest. Processing gain is defined to be the ratio of the bandwidth of the spreading chip sequence, or chip rate, to the bandwidth, or bit rate, of the user signal.

Electromagnetic radiation propagating so as to carry information from a base station 12 to a mobile subscriber 11, as depicted by the arrow at 18 in FIG. 2, is hereinafter referred to as a downlink. Electromagnetic radiation propagating so as to carry information from a mobile subscriber 11 to a base station 12, as depicted by the arrow at 20 in FIG. 2, is hereinafter referred to as an uplink.

Figure 3:
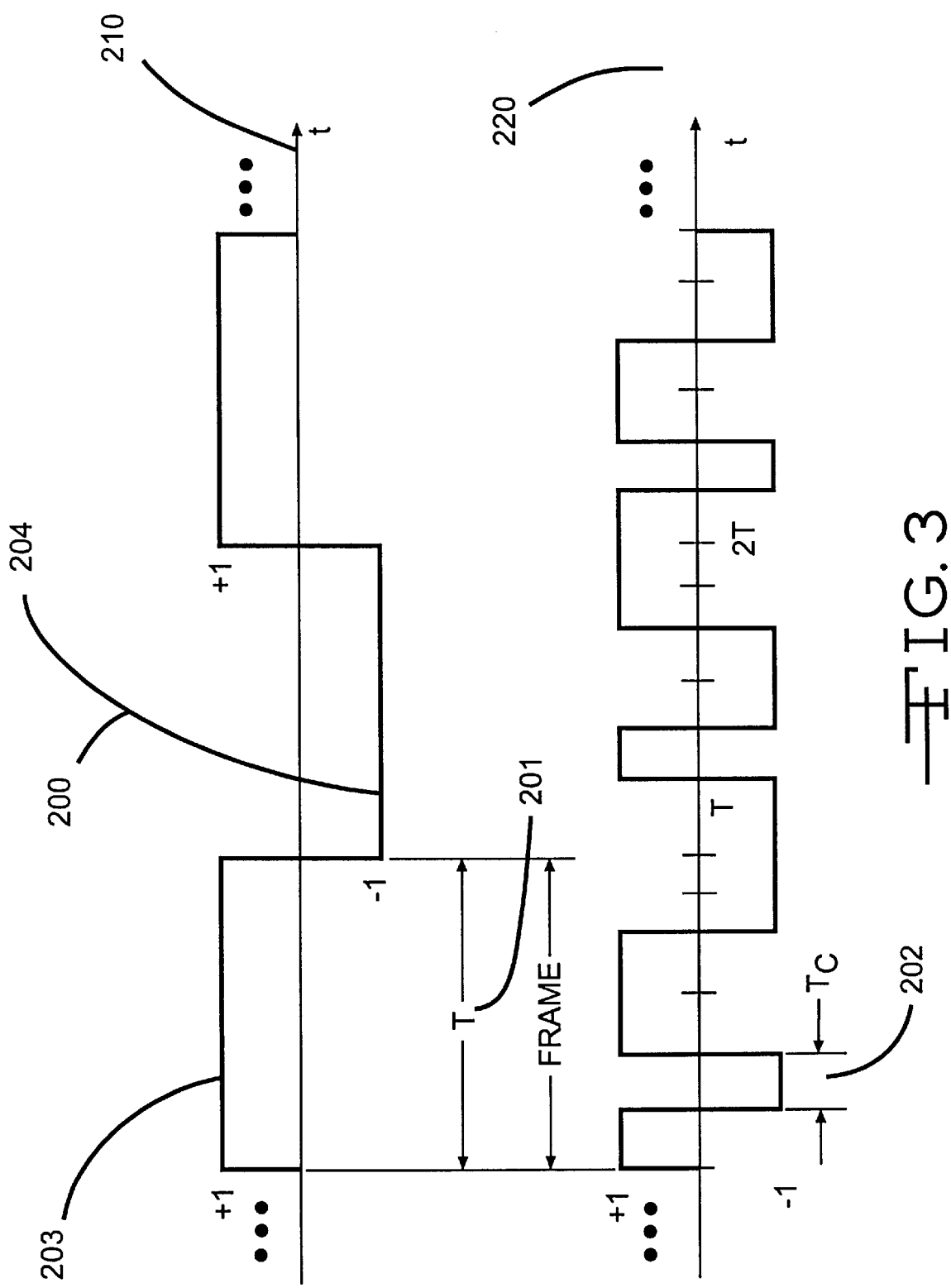
FIG. 3 depicts the relationship between a data symbol stream representing data to be transmitted and a signature encoded chip bit stream propagated in correspondence to the data symbol stream.

Referring now to FIG. 3 there is shown at 210 a symbol stream representing data and/or information to be transmitted from a source to a receiver. FIG. 3 depicts three contiguous data symbols 203,204 and 205, in this case +1, −1, +1, respectively. Data symbols 203,204 and 205 are also referred to herein as information bits, or symbols.

Shown at 220 in FIG. 3 is a rate increased transmitted pulse stream corresponding to the symbol stream at 210. As shown, a rate increased signature stream of (+1, −1, +1, +1, −1, −1) level pulses is propagated for each +1 (for example at 203 and 205) in the lower rate data symbol stream shown at 210. The inverse of this signature stream is propagated for each −1 (e.g., at 204) in the symbol stream.

The rate increased data stream shown at 220 of FIG. 3 is the signature, or spreading chip sequence of the associated source. A frame is defined to correspond to a symbol having a duration T, shown at 201, and the time interval of each +1 or −1 level in the rate increased stream is designated the chip duration $T_c$ (at 202). Processing gain is defined to be the ratio $T/T_c$. Each frame is composed of a fixed number of "chips" (also referred to as "spreading chips". Therefore, six +1 and −1 chips are propagated during each frame, or time T. Thus the signature associated with the representative example at 220 is the ordered set (+1, −1, +1, +1, −1, −1).

Figure 4:
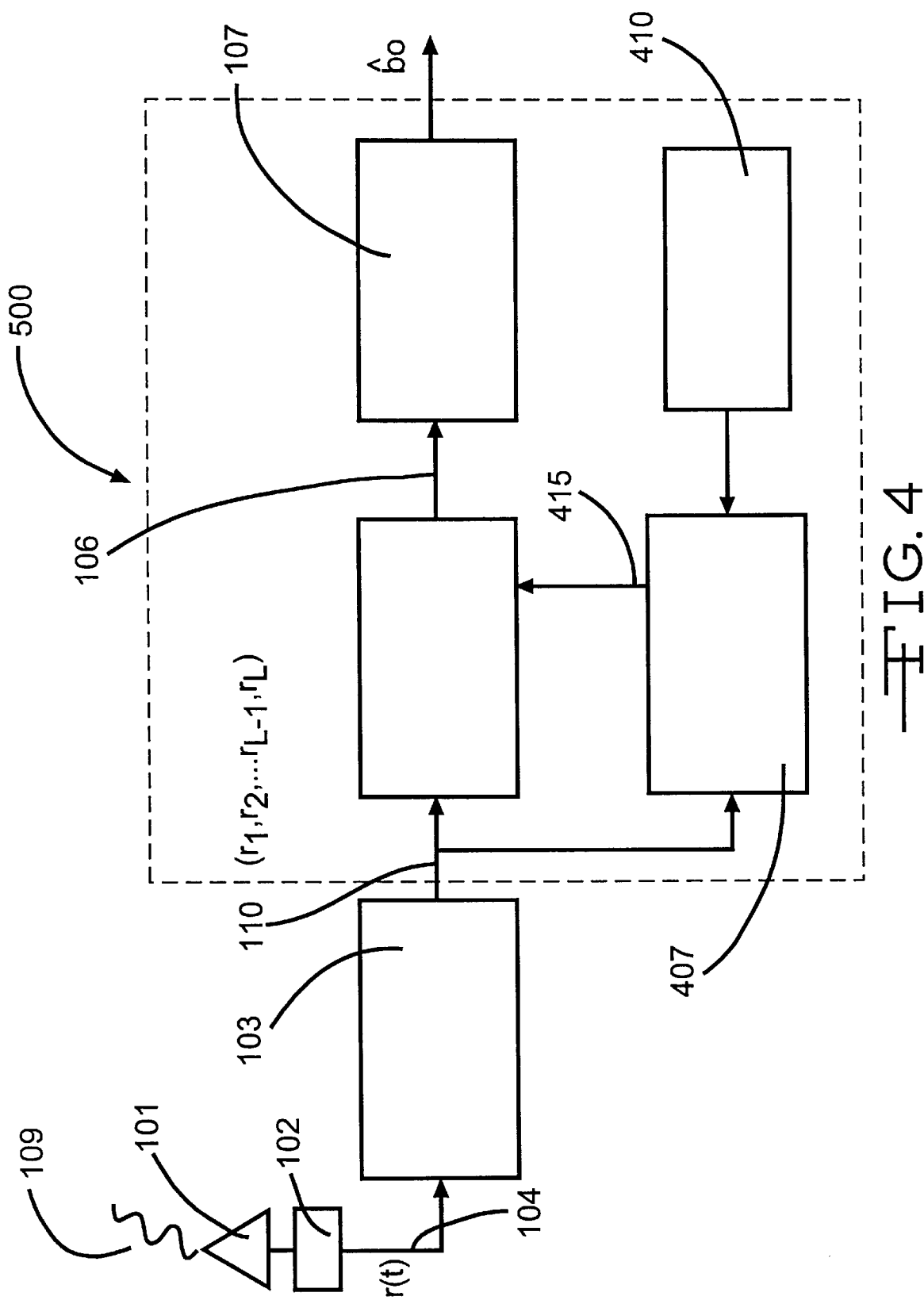
FIG. 4 is a block diagram of a CDMA receiver in accordance with the present invention.

FIG. 4 shows, in block diagram form, a receiver 400 according to the present invention as it functions in the DS/SS CDMA system described generally above. Receiver 400 comprises signal receiving and pre conditioning means including antenna 101, carrier demodulating means 102 and sampling means 103. Receiver 400 further comprises detector means 500 including filter means 105, sign determining means 107, multiplier input generating means 407 and means for storing a predetermined signature 410.

For purposes of this specification, and the following discussion, boldface variables shall be used to denote vectors in $R^L$, or to denote matrices. $E\{\cdot\}$ defines the statistical expectation operation, $x^T$ is the transpose of x, and I or 1 denotes an identity matrix. The symbols $<\cdot,\cdot>$ and $\|\cdot\|$ denote inner product and the norm, respectively, both in $R^L$ space unless otherwise specified.

In the system under consideration, K users, such as those depicted at 11 in FIG. 1, transmit over an AWGN (Additive White Gaussian Noise) channel such as that represented in FIG. 2 at 130, to produce a received signal 109 at antenna means 101 as best shown in FIG. 4.

Signal 109 contains the transmitted symbols which represent user data (a representative example of which is illustrated in FIG. 3). Signal 109 is applied to conventional preselecting and filtering means 102 which provides the initial receiver selectivity. Such means are well known in the art and need not be described here.

Preselecting and filtering means 102 may also include carrier demodulation means and may also perform low pass filtering. Such circuits are well known in the art. For example, preselecting and filtering means 102 may comprise a well known base band demodulator that demodulates the received signal 104 in accordance with the carrier modulation scheme used in the transmitter to provide a baseband signal at the output of carrier demodulating means 102.

The output of preselecting and filtering means 102 is continuous-time received signal r(t), represented at 104. Signal r(t) can be described mathematically as follows:

$$r(t) = \sum_{i} \sum_{k=0}^{K-1} \sqrt{E_k}\, b_k(i) s_k(t - iT) + n(t)$$

In this expression of r(t), with respect to the k-th user, $E_k$ is the received energy, $b_k(i) \in \{-1,1\}$ is the i-th information bit, and $s_k(t)$ is the signature, also referred to herein as the spreading code. T is the transmitted symbol period as shown in FIG. 3 at 201. The filtered channel AWGN is n(t).

The signature of every user is composed of L spreading chips, as illustrated in FIG. 3, and can be represented by $$s_k(t) = \sum_{j=1}^{L} c_k(j) P_{T_c}[t - (j-1)T_c]$$

where L also represents the system processing gain, which can be expressed as the ratio of $T/T_c$.

The assigned spreading pulses, or chips, for the K-th are represented by: $C_k(j) \in \{-1,1\}$, j=1,...,L. $P_{t_c}(t)$ is the spreading pulse, or chip, having duration $T_c = T/L$, as depicted in FIG. 3 at 202.

The signatures are assumed to be normalized such that they may have non zero cross correlation and such that $$\int_0^T s_k^2(t)\,dt = 1,\; \forall k = 0,\ldots,K-1$$

Signal r(t) at 104 is applied to sampling means 103. Sampling means 103 can be any sampling means which performs chip ($P_{t_c}(t)$) matched integration of the DS/SS CDMA signal r(t) at 104 and sampling at the chip rate. The result is dumped, or output at the end of each chip interval of duration $T_C$ producing an output such as represented at 110.

The design of such sampling means is well known in the art. For example, sampling means 103 may comprise a well known integrate and dump filter block wherein the received signal 104 is integrated and sampled at the chip rate and the results dumped at output 110 at the end of each chip interval of duration $T_C$.

As previously stated, sampling means 103 performs conventional chip matched filtering and sampling at the chip rate $1/T_c$, resulting in L collected samples at the output of sampling means 103 for every received frame, or chip interval L. These samples may be represented mathematically as elements of an L-dimensional vector as follows:

$$r[n] \triangleq \int_{(n-1)T_c}^{nT_c} r(t) P_{T_c}[t-(n-1)T_c]\,dt,\; n=1,\ldots,L$$

The $R^L$ discrete time version of r(t) can be written in the form of an L-dimensional vector as:

$$r = \sum_{k=0}^{K-1} \sqrt{E_k}\, b_k S_k + n$$

where $S_k$ is the sampled signature of user k, i.e. a vector of dimension L, and where the random vector n is assumed to be white Gaussian noise with autocorrelation matrix $$E\{n^T n\} = \sigma^2 1_{L \times L}$$

The Multiple Access Interference (MAI) term of the $R^L$ discrete time version of r(t) can be written as:

$$I = \sum_{K=1}^{K-1} \sqrt{E_k}\, b_k S_k,$$

Thus, if the user of interest is 0, and the predetermined spreading code transmitted for that user is $S_0$ then the available vector sample 110 present at the output of sampling means 103 can be described as follows:

$$r = \sqrt{E_0}\, b_0 S_0 + I + n$$

The sample at 110 is provided to both filter means 105 and multiplier input generating means 407 of detector means 500. Means for storing a predetermined signature 410 contains the sequence of chips representing the signature of the user of interest. Means for storing a predetermined signature 410 may be any electronic storage means utilized in storing digital signals for processing by a computer, microprocessor, or digital signal processor. These storage means include, but are not limited to, Random Access Memory (RAM) and Read Only Memory (ROM). The stored signature of the user of interest is provided to multiplier input generating means 407.

multiplier input generating means 407 utilizes the information from available vector sample 110 and the prestored signature to formulate multipliers, or tap weights to be provided at its output 415 to filter means 105.

Output 415 of multiplier input generating means 407 can be represented mathematically as a tap weight vector W where:

$$W^T = [w_1, w_1, \ldots, w_L]$$

Output 415 provides the tap coefficients, or multipliers, for filter means 105, which can be, in a preferred embodiment, a transversal, or finite impulse response (FIR) filter of a type well known in the art. Other appropriate filters, such as adaptive Wiener filters, preferably Weiner reconstruction filters, may be employed in the present invention and these remain within the scope of the invention.

Filter means 105 shifts, multiplies and sums the input vector samples at 110. The multipliers have two inputs. The multipliers have as one input the sequence of received signal samples. The other input is the sequence of filter coefficients described by the vector W. The output of filter means 105, for every frame of input data, is an estimation of the symbol of the user of interest, transmitted during that frame.

The output 106 of filter means 105 is provided to sign determining means 107. Sign determining means 107 determines the sign, positive or negative, of its input and provides an output representing information bits $b_0$ for the user of interest, i.e. user data.

Figure 5:
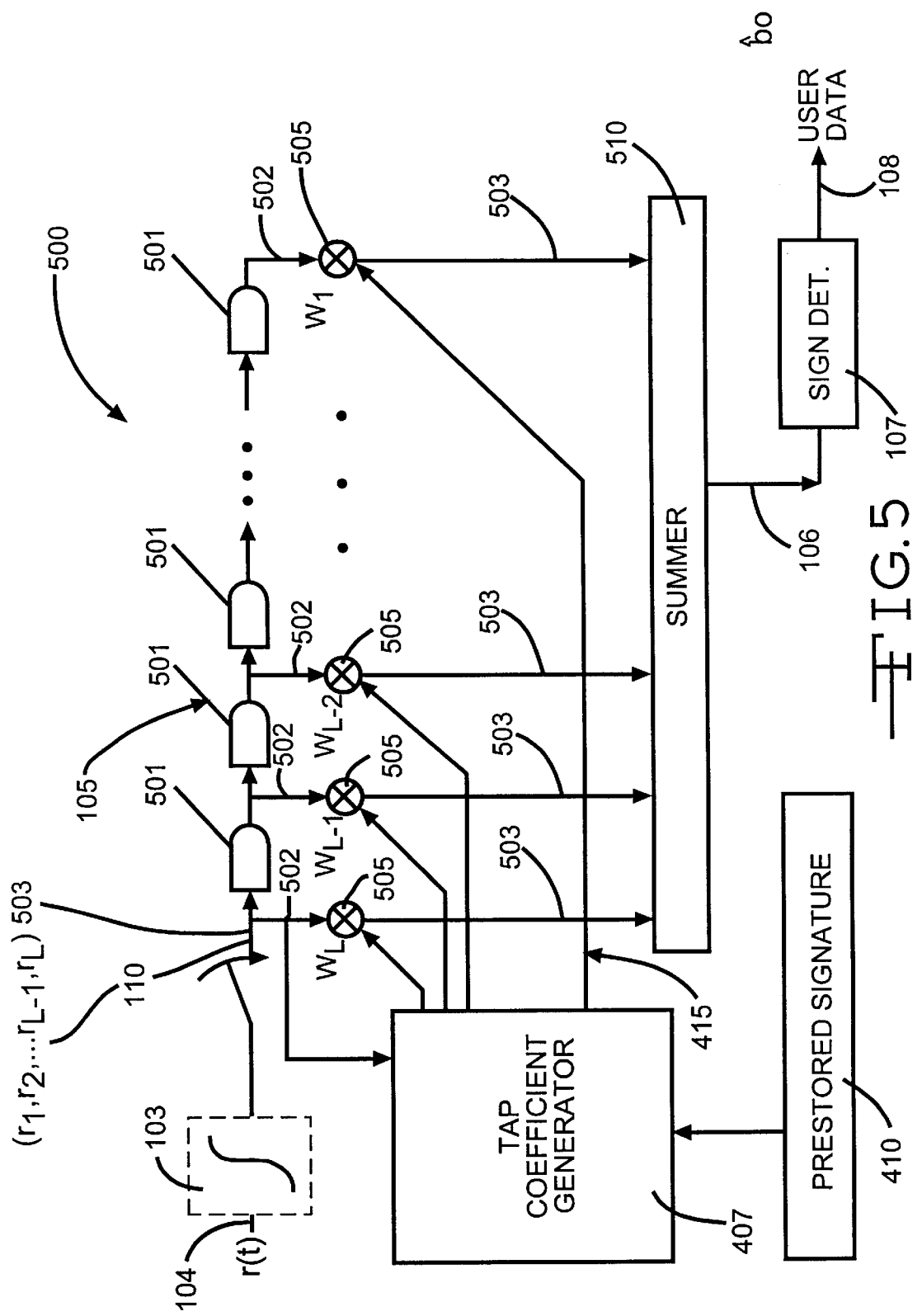
FIG. 5 is a detailed block diagram of a demodulator according to the present invention.

Turning now to FIG. 5 there is shown a more detailed block diagram of a preferred embodiment of a detector 500 of a CDMA receiver constructed according to the teachings of the present invention. Detector 500 functions to produce at its output 106, a bit decision corresponding to the received symbol for each received frame.

As previously described, present at input 104 of sampling means 103 is the continuous time signal r(t). Continuous time signal r(t) is converted to a sampled data signal by sampling means 103. Sampling means 103, performs chip ($P_{tc}$(t)) matched integration of r(t) and sampling at the chip rate $1/T_C$ over time T to produce samples $r_1, r_2, \ldots r_{L-1}, r_L$ as depicted at 110. The samples are provided to one or more delay elements 501 having delay Tc. Preferably, the number of delay elements is equal to L, i.e. the number of collected samples, or the processing gain.

The samples appearing at 502 are multiplied by the multipliers, or coefficients ($w_1 \ldots w_L$) appearing at the inputs to multipliers 505. The resultant products 503 are summed in summer 510, with the resulting sum appearing at output 106 of summer 510. The resultant sum is provided to sign determining means 107.

Multiplier input generating means 407 utilizes the sampled signal r present at its input 415, and the prestored signature, or known spreading code, as represented at 410 assigned to the user of interest to accurately produce user data.

Figure 6:
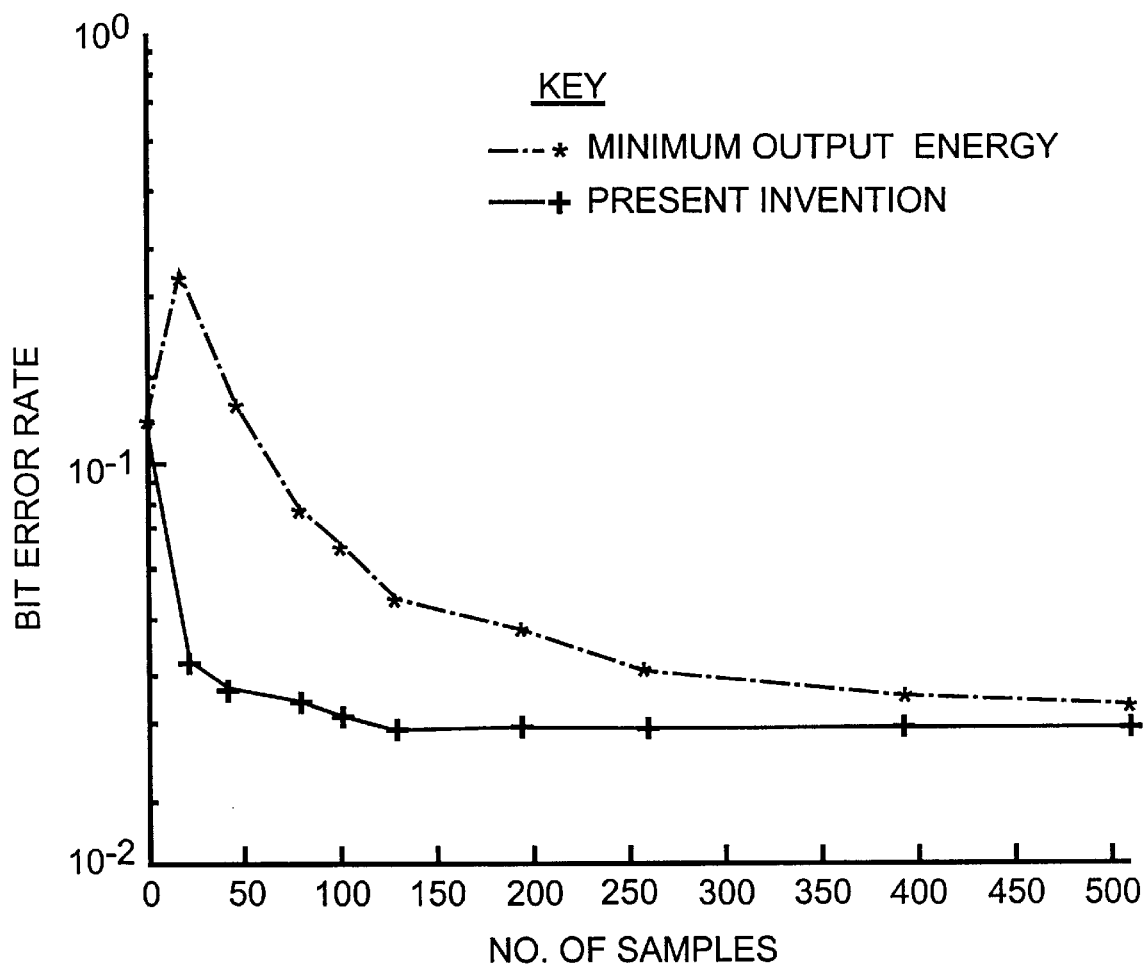
FIG. 6 shows a comparison of the bit error rates per number of data samples of the detector of the present invention with a detector of the Minimum Output Energy (MOE) type.

A comparison of the bit error rates per number of data samples of the detector of the present invention with a detector of the Minimum Output Energy (MOE) type is illustrated in FIG. 6.

Figure 7:
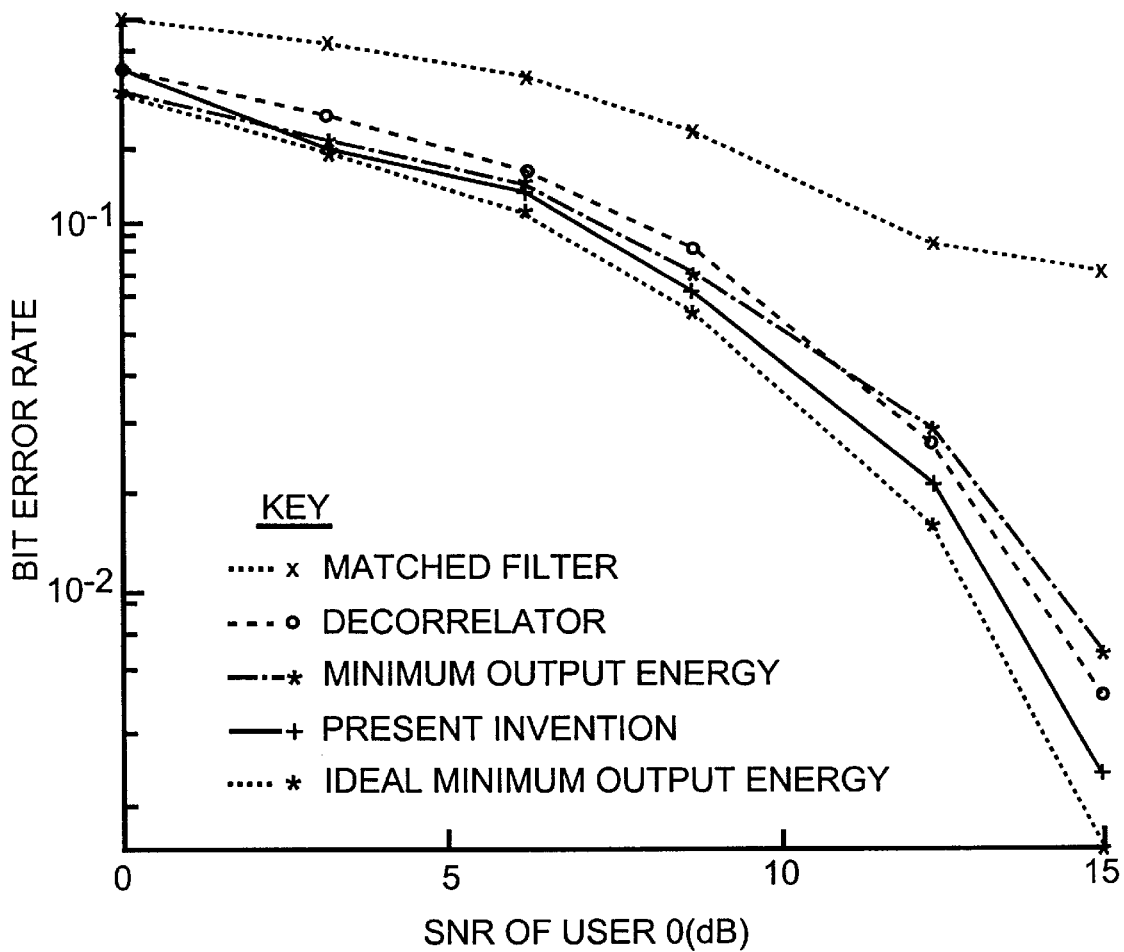
FIG. 7 shows a comparison of the detector of the present invention with detectors of the matched filter, decorrelator and MOE types, as well as with an ideal MOE detector on the basis of bit error rate as a function of the SNR of the user of interest in the presence of strong interferers.

FIG. 7 shows a comparison of the detector of the present invention with detectors of the matched filter, decorrelator and MOE types, as well as with an ideal MOE detector, on the basis of bit error rate as a function of the SNR of the user of interest in the presence of strong interferers, ambient noise and non zero signature cross-correlation. Estimates of the G auxiliary vector, the scalar parameter k and the input autocorrelation matrix that appears in the MOE design are based on 128 received signal samples.

Figure 8:
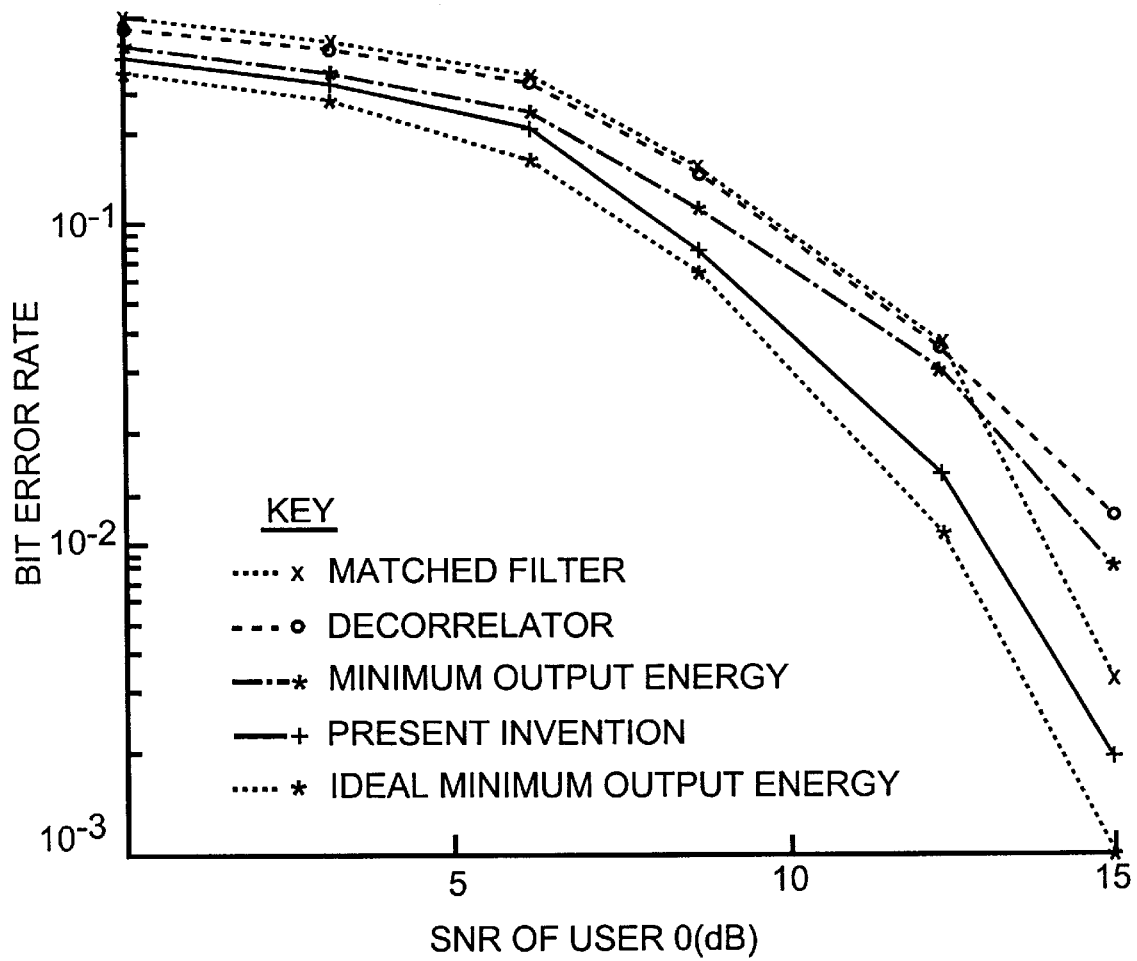
FIG. 8 shows a comparison of the detector of the present invention with detectors of the matched filter, decorrelator, MOE types, as well as with the ideal minimum output energy detector on the basis of bit error rate as a function of the SNR of the user of interest in the presence of weak interferers.

FIG. 8 shows a comparison of the detector of the present invention with detectors of the matched filter, decorrelator, MOE types, as well as with the ideal minimum output energy detector on the basis of bit error rate as a function of the SNR of the user of interest in the presence of weak interferers, ambient noise and non zero signature cross-correlation. Estimates of the G auxiliary vector, the scalar parameter k and the input autocorrelation matrix that appears in the MOE design are based on 128 received signal samples.

Returning now to FIG. 5, filter means 105, comprises essentially a transversal filter structure as is known in the art, and which includes an L-tap delay line 501, wherein L is the number of chips in the signature, or the processing gain; multiplier means 505, and summing means 510.

In general, FIR filters are well known and understood in the art. The design of such filters is known and is described in such texts as Adaptive Filter Theory, 2nd Ed., by Simon Haykin, Prentice Hall 1991, hereby incorporated by reference.

The L-tap delay line consists of L delay elements 501 having outputs coupled to a corresponding number of multiplier means 505. The L-tap delay line operates to sequentially shift, at the chip rate, sampled outputs($r_1 \ldots r_L$) during each signature interval. At the end of each signature interval, multiplier means 505 multiply the output of delay elements 501 with multiplier inputs, or tap coefficients ($w_1 \ldots w_L$). Tap coefficients ($w_1 \ldots w_L$) are provided by multiplier input generating means 407.

Filter means 105 may be implemented in hardware such as by flip flops, shift registers, or other known hardware devices as are conventionally employed in the art. Alternatively, filter means 105 may be implemented as a software filter wherein all of the input data samples are storable in memory. Several digital signal processors implementing digital filters are commercially available from a number of companies, including Texas Instruments. In addition, code listings for computer program implementations of the embodiments of the present invention are contained in Appendix B.

Software filter routines may perform the task of accessing a number of sample segments of the input data space, performing the calculations described herein, and storing the resulting output sequence in an array of memory locations.

Summing means 510 sums the outputs of multiplier means 505 to provide summation means output 106. Summation means output 106 represents superposition of the multiplier outputs over one signature interval. Summation means output 106 is applied to sign determining means 107. The output of sign determining means 107 represents the symbol detected by the receiver.

Multiplier input generating means 407 provides multiplier inputs, or coefficients, designated ($w_1 \ldots w_L$), as inputs to each of multipliers 505. Such coefficient generating means are not described in the prior art and are a significant feature of the present invention. Further details of the mathematical description of detector 500 including coefficient generating means 407 and filter means 105 is provided in Appendix A, and in a previously filed divisional application by the named inventors.

In a preferred embodiment, multiplier input generating means 407 includes digital signal processing means such as those available from a number of companies, including Texas Instruments, Inc.

Multiplier input generating means 407 is characterized by the set of multiplier inputs, or coefficients it generates. The set of coefficients is described by the vector $W=S_0-kG$, where $_0S$ is the effective signature, or spreading code, of the user of interest. In a non multi path environment effective $S_0$ is the signature of the user of interest, while in a multipath environment effective $S_0$ is the multipath channel processed signature of the user of interest. G is a vector, referred to herein as an auxiliary vector, in $R^L$ orthonormal to $S_0$, i.e., $<G,S_0>=0$, and $<G,G>=1$, where $$G = \frac{E\{r_{\perp s0}\}}{\|E\{r_{\perp s0}\}\|}$$

and, $$k = \frac{E\{\langle r, S_0\rangle \langle r, G\rangle\}}{E\{\langle r, G\rangle^2\}}$$

and wherein:

$$r_{\perp s0} = \text{sgn}(\langle r, S_0\rangle) \frac{r - \langle r, S_0\rangle S_0}{\sqrt{\|r\|^2 - \langle r, S_0\rangle^2}}$$

Alternate means for the generation of k is as follows:

$$k_{n+1} = k_n + \frac{c}{n}\langle r_n, S_0 - k_n G\rangle\langle r_n, G\rangle,$$

wherein n=1,2,3, . . . , and c>0 is an arbitrary scalar, or c/n=$\mu$>0 for all n, where $\mu$ is an arbitrary vector.

These relationships can be mathematically derived by the techniques and methods generally described in the previously filed provisional application relating to this invention and filed by the present inventors, and in Appendix A herein.

Multiplier input generating means 407, in a preferred digital signal processor (DSP) implementation stores the bits representing $S_0$ in signature prestoring means 410 which may be a specified memory location in the memory area of the DSP itself. Input r comprising samples ($r_1 \ldots r_L$), shown at 420 are applied to multiplier input generating means 407 and filter means 105.

The signal representing an estimate of the transmitted symbol is applied to a sign determining means 107. Sign determining means 107 determines the sign, positive or negative, of the signal at its input and indicates the sign at its output. Any of a variety of well known components such as comparators may be employed in the present invention as sign determining means. The output of sign determining means 107 is a representation of the transmitted symbol.

Figure 9:
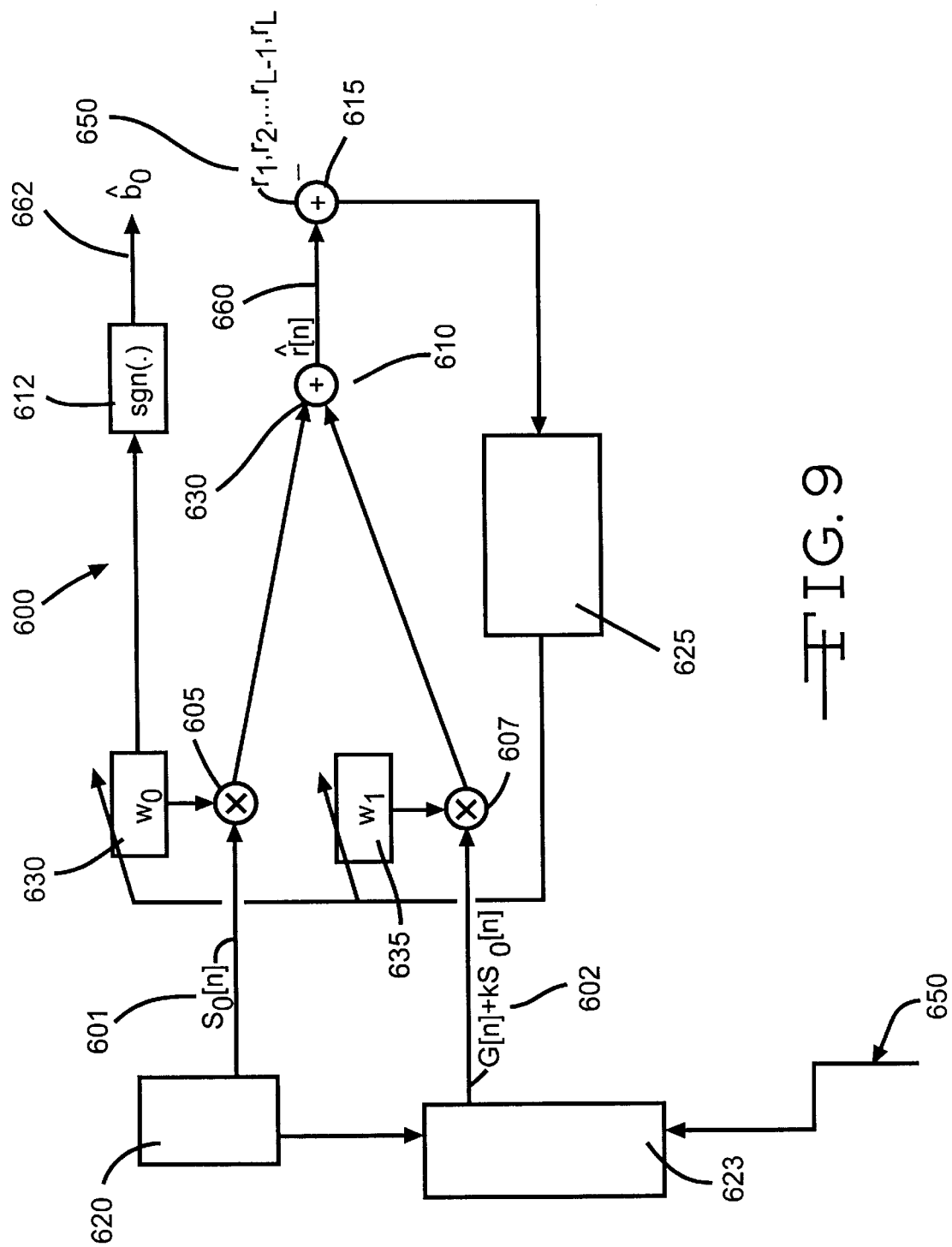
FIG. 9 shows a Weiner reconstruction filter embodiment of the present invention.

An alternate embodiment of the demodulator of the present invention is implemented in a 2-tap Weiner reconstruction filter. Such a demodulator 600 is shown in FIG. 9.

Input samples $r_1, r_2, \ldots r_{L-1}, r_L$, shown at 650, are applied one after another to subtracting means 615 where they are subtracted from the output of summing means 610. The difference signal is applied to adaptive control mechanism 625, described in more detail below.

Demodulator 600 has as input sequences $S_0[n]$ as shown at 601, and $G[n] + k\, S_0[n]$ as shown at 602. Input sequence 601 is the pre stored signature of the user of interest similar to that shown at 410 in FIG. 5. Input sequence 602 is generated by multiplier input generating means 623. Multiplier input generating means 623 also has as an input the sequentially applied input samples 650. Multiplier input generating means 623 generates sequence 602 based on the incoming samples and the signature and is determined according to the relationship $G[n] + kS_0[n]$, where G, k and $S_0$ are determined according to the formulas provided and described in the embodiment of FIG. 5, and n ranges from 1 to L. Input sequences 601 and 602 are applied to multipliers 605 and 607.

Adaptive control mechanism 625 generates multiplier inputs, or tap coefficients $w_0$, shown at 630; and $_1w$, shown at 635, by standard Least Mean Square (LMS) or Recursive Least Squares (RLS) algorithms known in the art and described in Adaptive Filter Theory, 2nd Ed., by Simon Haykin, Prentice Hall 1991, as incorporated previously herein by reference.

Multiplier inputs 630 and 635 are also applied to multipliers 605 and 607. The result is applied to second summing means 630 to produce a signal 660 representing an estimate of the incoming samples 650. The difference between the signal at 660 and the incoming sample at 650 represents the error in the estimate of the incoming sample that drives the adaptive control mechanism.

Sign determining means 612 determines the sign of 630 and thereby generates a representation of the transmitted symbol, or user information bit.

For vectors $S_0$ and G, and scalar k as previously defined, the mean square signal reconstruction optimal value of $w_0$ in FIG. 9 is:

$$w_0 = E_n\{<r, S_0 - kG>\}.$$

The decision statistic $w_0$ is confined within a single symbol interval and the statistical expectation above is taken only with respect to the noise component n in the received signal r. The decision on the transmitted information bit is made by sign determining means 612 applied on $w_0$.

The filter of the present invention may be implemented according to methods well known and understood in the art. Using the teachings of the present invention, several options for implementing the present invention will be readily apparent to those skilled in the art. These options include either off-the-shelf or customized hardware, the use of one or more programmable digital signal processors running programs which emulate the physical characteristics of a hardware version of the filter of the present invention, or a combination of hardware and software. Representative code listings and computer program algorithms for software implementations of the preferred embodiments of the present invention, including calculations for parameters $S_0$, k, and G are contained in Appendix B. All of these implementations remain within the scope of the present invention.

While the specification concludes with claims defining the features of the invention that are regarded as novel, the invention will be better understood from the following description in conjunction with the drawing figures, in which like reference numerals are carried forward.

We claim:

1. A circuit for demodulating a received signal wherein the received signal includes a transmitted symbol, unwanted interference and noise, the circuit including:

means for obtaining one or more discrete samples of the received signal;

means, responsive to said means for obtaining one or more discrete samples, for filtering out the unwanted interference and noise, including multiplying means having at least two sets of inputs, at least one set being determined by the relationship between the parameters $S_0$, k, and G, wherein $S_0$ is the spreading code of a user of the circuit, k is a steering parameter and G is an auxiliary vector; and wherein the relationship between $S_0$, k, and G is given by $S_0-kG$.

2. The circuit according to claim 1 wherein said multiplying means includes a number of multipliers, the number of multipliers corresponding to the processing gain of the circuit.

3. A circuit for demodulating a received signal wherein the received signal includes a transmitted symbol, unwanted interference and noise, the circuit including:

means for obtaining one or more discrete samples of the received signal;

means, responsive to said means for obtaining one or more discrete samples, for filtering out the unwanted interference and noise, including multiplying means having at least two sets of inputs, at least one set being determined by the relationship between the parameters $S_0$, k, and G wherein $S_0$ is the spreading code of a user of the circuit, k is a steering parameter and G is an auxiliary vector; and wherein the relationship between $S_0$, k, and G is given by $G+kS_0$.

4. A method for demodulating a received signal wherein the received signal includes a transmitted symbol and unwanted interference and noise, the method including the steps of:

a) obtaining one or more discrete samples of the received signal;

b) filtering out the unwanted interference and noise from said discrete samples wherein the filtering out step includes the step of multiplying at least two sets of inputs, at least one set being determined by the relationship between the parameters $S_0$, k, and G wherein $S_0$ is the spreading code of a user of the circuit, k is a steering parameter and G is an auxiliary vector;

c) wherein the steps are performed by a program running on a computer.

5. A circuit for demodulating a received signal wherein the received signal includes a transmitted symbol, unwanted interference and noise, the circuit including:

means for obtaining one or more discrete samples of the received signal;

means, directly responsive to said means for obtaining one or more discrete samples, for filtering out the unwanted interference and noise, including multiplying means having at least two sets of inputs, at least one set being determined by the relationship between the parameters $S_0$, k, and G, wherein $S_0$ is the spreading code of a user of the circuit, k is a steering parameter and G is an auxiliary vector, wherein the circuit reconstructs the transmitted symbol from the received signal in an unsupervised manner using only the spreading code assigned by a home station to the user of the circuit to whom information is being transmitted, and wherein k and G are determined from the received signal and the assigned spreading code by the relationship:

$$G = \frac{E\{r \perp s_o\}}{\|E\{r \perp s_o\}\|};$$

where $$r \perp s_o \stackrel{\Delta}{=} \operatorname{sgn}(\langle r, S_o \rangle) \frac{r - \langle r, S_o \rangle S_o}{\sqrt{\|r\|^2 - \langle r, S_o \rangle^2}},$$

and $$G = \frac{RS_o - (S_0^H RS_0)S_0}{\|RS_o - (S_0^H RS_0)S_0\|},$$

where R is the received signal data autocorrelation matrix that can be sample average estimated, $$\hat{R} = \frac{1}{N} \sum_{j=1}^{N} r_j r_j^H,$$

and $$k = \frac{E\{\langle r, S_o \rangle \langle r, G \rangle\}}{E\{\langle r, G \rangle^2\}}.$$

* * * * *